United States Patent [19]

Piot et al.

[11] Patent Number: 4,650,589

[45] Date of Patent: Mar. 17, 1987

[54] PROCESS FOR DECOLORING SUBSTANCES COLORED BY TETRAPYRROLE COMPOUNDS

[75] Inventors: Jean-Marie Piot; Didier Guillochon, both of Villeneuve d'Ascq; Pierre Charet, Marcq en Baroeul; Daniel Thomas, Villeres sur Coudun, all of France

[73] Assignees: Centre National de la Recherche Scientifique CNRS, Paris; Universite des Sciences et Techniques (Lille I), Cedex, both of France

[21] Appl. No.: 711,678

[22] Filed: Mar. 14, 1985

[30] Foreign Application Priority Data

Mar. 15, 1984 [FR] France .................................. 84 04004

[51] Int. Cl.$^4$ ............................................. B01D 15/00
[52] U.S. Cl. .................................... 210/691; 210/917; 210/927
[58] Field of Search .......................... 210/691, 917, 927

[56] References Cited

U.S. PATENT DOCUMENTS

| | | | |
|---|---|---|---|
| 3,998,732 | 12/1976 | Solbach et al. | 210/691 |
| 4,216,084 | 8/1980 | Ikari et al. | 210/691 |
| 4,411,794 | 10/1983 | Schwinn et al. | 210/927 |

*Primary Examiner*—Ivars Cintins
*Attorney, Agent, or Firm*—Brisebois & Kruger

[57] ABSTRACT

Blood products and other substances colored by tetrapyrrole compounds such as porphyrins or metalloporphyrins, in an aqueous solution, are decolored by contacting the aqueous solution with an adsorbent selected from among alumina, magnesia, and magnesium silicate, and the resulting colorless solution is then collected. The solution to be decolored can be adjusted to a pH of 2 to 6, and can be at a temperature in the range of 0° to 60° C., but is usually decolored at ambient temperature.

11 Claims, No Drawings

PROCESS FOR DECOLORING SUBSTANCES COLORED BY TETRAPYRROLE COMPOUNDS

The present invention relates to a process of decoloring substances colored by tetrapyrrole compounds such as porphyrins or metalloporphyrins, obtained from animal or vegetable compositions, and includes those which are obtained by microbiological processes. The invention also has as an object, the colorless products obtained by the process.

BACKGROUND OF THE INVENTION

Numerous biological substances are known in which the fractions or derivatives of these substances are strongly colored by compositions of tetrapyrrole structure such as, for example, heme or chlorophyls. These compounds are complex molecules formed of four pyrrole nuclei substitutes on the beta carbons and which are united between them, by alpha carbons, by the intermediary of the methanol radical-CH=.

The substituents carried by the beta carbons of the pyrroles are, in particular, the groups of methyl, vinyl, propionyl (eventually estherified), or formal. In addition, in the chlorophyls, a methanyl group is connected to the beta carbon of a neighboring pyrrole to form a cyclopentanone cycle.

In addition, in hemoglobin and its derivatives, an atom of iron is bound to four pyrrole azotes. Similarly, the cholorphyls contain an atom of magnesium bound to four pyrrole azotes.

The presence in these compositions of strong colors is often undesirable in a number of products of animal or vegetable origin and satisfactory decoloring of these products is difficult.

The problems posed by decoloring of derivatives of blood are well known, and it is also known by specialists that analogous problems are present for decoloring substances containing other tetrapyrrole colorants, such as, for example, the chlorophyls or their derivatives.

One knows that the preparation and purification of the derivatives of blood presents problems of decoloring which are difficult to solve. In effect, the majority of blood derivatives are strongly colored by hemoglobin even if the hemoglobin is present in small quantities.

One knows that the red corpuscles of blood are capable of constituting a significant source of protein, only a small portion of which is recovered, principally for human or animal food, the rest being rejected as refuse.

This rejected large portion of blood products obtained from slaughtering, constitutes not only wasting of proteins of very high quality, but is also a significant source of pollution.

One knows that hemoglobin represents two tiers of proteins of blood and that its coloring is intense, which makes it very difficult to use the blood in food, with the exception of its traditional use in sausages.

The blood destined to be used in human food is usually centrifuged in a manner to separate the plasma (composed of colorless proteins) from cruor, which is the cellular solid residue constituted of about 95% hemoglobin. When the plasma is used in salted or frozen meat, all the cruor is rejected and wasted.

The problems of coloring of products of blood are due to the fact that the hemoglobin molecule comprises prosthetic groups called hemes which are the strongly colored complex molecules formed of four heterocyclic azote nuclei connected to an atom of iron. To obtain non-colored blood derivatives, the molecules of heme can be separated from the rest of the molecule (globin).

However, it is well known that the heme-globin bond is relatively strong. To rupture this bond acetone-containing hydrochloric acid has been used. The liberated heme dissolves in the acetone while the decolored protein precipitates; see, for example: LEWIS, U. J.; J. Biol. chem., 206 109 (1954).

However, the decoloring of hemoglobin by acetone is difficult to exploit industrially. In essence, the volumes of acetone necessary for complete decoloring are very high, on the order of 10 volumes of acetone for one volume of blood, and requires recycling of this organic solvent. In addition, the use of large volumes of acetone poses safety problems.

It has also been proposed to decolor hemoglobin by the use of diverse chemical transformations such as oxidation by oxygenated water. This method presents various disadvantages such as chemical modification of the proteins by the oxidation, and the formation of insoluble products.

Another method of decoloring consists of enzymatic hydrolysis of hemoglobin with production of two forms of peptides: the hemen peptides (colored); and the non-hemen peptides (colorless). The colorless peptides have been separated by ultrafiltration, gel-filtration or adsorption on active carbon; see, for example, French Patent Application No. 79 02940 (2,415,968) and the article by Jean REGNIER, R.T.V.A., November 1983, pages 29-35.

However, the techniques of decoloring based on hydrolysis of hemoglobin do not result in decoloring sufficient for certain applications, and involve a significant loss of peptides.

SUMMARY OF THE INVENTION

The process of the invention has an object, to remedy these disadvantages.

The process of the invention is based on techniques of adsorption. It presents the advantages of using an adsorbent in small amounts which is easy to regenerate, contrary to the other adsorbents such as active carbon.

This is a low pollution process which can be practiced using, in addition to the adsorbent, water, hydrochloric acid, and soda. In addition, this process avoids complicated and costly techniques such as ultrafiltration.

The present invention has for an object a process for decoloring an aqueous solution of substances colored by tetrapyrrole compounds, characterized by the fact that one contacts the aqueous solution with at least one adsorbent selected from the group consisting of alumina, magnesia, and magnesium silicate, and the decolored solution obtained is recovered.

It has in effect been discovered that surprisingly, these three adsorbents efficiently solve the problems of decoloring of substances containing tetrapyrrole colorants, contrary to the numerous other usual adsorbents.

The present invention has in particular for an object a process for decoloring an aqeous solution of derivatives of blood colored by hemoglobin or by other hemen compounds, characterized by the fact that the aqeous solution is brought into contact with at least one adsorbent selected from the group consisting of alumina, magnesia, and magnesium silicate, and the resulting colorless solution is collected.

The hemen compounds are, for example, those obtained after partial or total hydrolysis of hemoglobin.

The starting product to be separated or decolored is obtained, for example, from the blood due to slaughtering. Usually, the blood is maintained in a liquid state by the addition of an anticoagulant, usually such as sodium citrate. The plasma is then separated from the cruor by centrifuging.

The cruor is then diluted with water to cause hemolysis, by osmotic shock, of the red corpuscles. For example, one volume of water is added to one volume of cruor, and the mixture is agitated. There is then obtained a hemolysate which can constitute the starting product for the process of the invention.

When it is desired to first proceed with hydrolysis of the hemoglobin, for example, under the action of proteases, the hemolysate is preferable subjected to conditions permitting denaturation of the proteins, using well known methods, for example, by treatment at extremes of pH or by heating to 85° C. One knows, in effect, that the denaturation of the proteins favors the action of the proteases.

The starting product can also be an extract solution of a vegetable substance, colored by chlorophyl.

For contacting the solution to be decolored, with the adsorbent, one can mix and agitate at least periodically, or the solution can be passed through a column containing the adsorbent. When the solution is mixed with the adsorbent, the adsorbent is separated to recover the colorless solution by decantation and/or filtration. One can repeat these operations if necessary. The quantity of the adsorbent and the time of contact are easily determined by routine experiments. To purify the resultant product obtained, one can further proceed, if necessary, with desalting according to the usual techniques. In the execution of the invention, the process of the invention can also include the following, either alone or in combination:

the starting aqeous solution can be at an acidic pH compatible with the solubility of the adsorbent; generally the pH can vary from 2 to 6;

adsorption can be effected at a temperature of 0° to 60° C.; usually adsorption is done at ambient temperature;

the starting product is hemolyzed blood, a blood hemolysate prepared by separating the cellular fraction obtained from first removing the plasma, or a hydrolyzed product of hemolysate blood;

the hydrolyzed product is obtained, for example, by hydrolysis with an enzyme, preferably a digested enzyme, selected from among pepsin, trypsin, chymotrypsin, etc.

In the case where the colored substance is a hemen compound, and particulary in the case where the product to be separated is the product of hydrolysis of hemolyzed blood, one preferably uses as adsorbents, alumina and/or magnesia, for which one has observed good selectivity of adsorption of hemen compounds.

When the starting product to be decolorized is constituted principally of hemoglobin, or of a hydrolysate thereof, the procedure of the invention permits obtaining colorless proteins or peptides: one could not detect any absorption due to the heme in the region of 400 mm. After evaporation under reduced pressure, the colorless product was present in the form of a white powder.

These products can be used in human or animal food, for example, by incorporation in delicatessen products or commercially manufactured soups, etc., or also in medical dietetics, by incorporation in dietetic food formulas, etc. In these diverse applications, the protein or peptide products obtained present the advantage of a very consistent and constant composition.

The examples which follow are non-limiting examples of the invention.

EXAMPLE 1

The starting product is bovine blood. The plasma is separated by centrifuging, and the recovered mass of solids, called cruor, are composed essentially of hemoglobin. The cruor is diluted by addition of water in the ratio of 1 Volume of water for one volume of cruor in order to hemolyze the red corpuscles.

Hydrochloric acid is added to the hemolysate obtained to provide a pH of 2 in order to denature the hemoglobin. The solution obtained is then diluted with water to obtain a concentration of hemoglobin equal to 5% (weight/volume).

Incubation of 200 ml of the solution obtained is done for 2 hours at 37° C. and pH 2 in the presence of pepsin (7,000 units Anson per gram of hemoglobin). During incubation, the value of pH of 2 is maintained, and can be done automatically.

After incubation, the pH is maintained at 3.5 by addition of a solution of soda, and is then centrifuged at 10,000 rpm for 15 minutes.

The supernatant, which is very colored, is made to traverse a column containing 100 g alumina (basic alumina 90 available from Merck & Co.) and the eluate is collected.

The eluate obtained is colorless (absorbence in the region 390–410 nm is less than about 0.02).

The eluate is then lyophilized.

After lyophilization, a white powder having the following characteristics is obtained:
weight: 2.2 g
content by weight of peptides: 85.5%

EXAMPLE 2

In this example one uses as the starting product a hemolysate of bovine blood denatured to pH 2 and diluted to a final concentration of hemoglobin of 5%, as in Example 1.

A volume of 200 ml of this hemolysate is incubated fro 2 hours at 37° C. and at pH 2 in the presence of 7000 units Anson of pepsin per gram of hemoglobin.

The pH is then brought to 8.5 by addition of an aqueous solution of soda. Trypsin is added to a ratio of 7000 units Anson per gram of hemoglobin and is allowed to incubate for 2 hours at a pH 8.5 and at 40° C. while maintaining the pH at this value of 8.5.

At the end of this second incubation, the pH is lowered to a pH of 3 by addition of an aqueous solution of hydrochloric acid, and the resulting mixture is centrifuged at 10,000 rpm for 15 minutes.

The supernatant which is very colored, is then passed through a column of alumina, as in Example 1.

The eluate obtained does not exhibit absorbence in the region 390–410 nm and is totally colorless (absorbence in the region of 390–410 nm was lower than 0.02%).

After lyophilization of the eluate, a white powder was obtained with the following characteristics:
weight: 2 g
content by weight of peptides: 65%

EXAMPLE 3

The product to be decolored is the same as above, a dilute hemolisate having a concentration of denatured hemoglobin of 5% (weight/volume).

A volume of 13.5 liters of this hemolisate is incubated for 2 hours, 40 minutes at 37° C. and a pH of 2, in the presence of 7000 units Anson of pepsin per gram of hemoglobin. During incubation, the pH is maintained constant.

The hydrolysate obtained is then centrifuged at 10,000 rpm for 15 minutes.

The supernatant obtained is more colored than that obtained in Examples 1 and 2. The supernatant is then mixed with increasing quantities of alumina in successive operations, and the mixture is agitated for a total of 15 hours. The mixture is then centrifuged at 5000 rpm for 15 minutes and the colorless supernatant is collected. The residue or culot of colored alumina is subjected to plural rinsing with water, and the colorless rinse water is mixed with the colorless supernatant. After lyophilization, a white powder is obtained with the following characteristics:

colorless product (absorbence less than 0.02 in the region 390–410 nm).
weight: 316 g
content by weight of peptides: 83.1%

EXAMPLE 4

The product to be decolored is the hydrolysate obtained in Example 3 after the step of hydrolysis with pepsin.

This hydrolysate is brought to a pH of 3.9 by addition of an aqueous solution of soda, and is then centrifuged at 10,000 rpm for 15 minutes.

The very colored supernatant is then separated into plural identical fractions which are each mixed and agitated for three hours with the same quantity of different adsorbants.

After the end of this step of adsorption, the respective fractions were centrifuged and the optical density of the supernatants was compared at 396 nm.

The efficiency of decoloring was evaluated using the following formula:

$$\text{Efficiency} = \frac{Ai - Ae}{Ai} \times 100$$

where $Ai$ represents the absorbence of the initial hydrolysate, and $Ae$ represents the absorbence after the adsorption treatment.

The results are summarized in the following Table 1.

TABLE 1

| Adsorbant Agents | $Al_2O_3$ | Florisil* | MgO | $Fe_2O_3$ | CuO | $MnO_2$ | $Fe_3O_4$ | $SiO_2$ |
|---|---|---|---|---|---|---|---|---|
| Efficiency of decoloring | 100 | 100 | 100 | 61 | 32 | 60 | 60 | 85 |

*Florisil (Trademark) is magnesium silicate

It should be noted that in this experiment, the quantity of alumina, Florisil, or magnesia used was not the minimum quantity for obtaining an efficiency of 100% so that the differences between theses 3 adsorbents and the others are even greater than what appears in Table 1.

EXAMPLE 5

In this Example cruor is decolored without hydrolysis or previous denaturation of the hemoglobin.

There is prepared as in the previous Examples, a hemolysate containing 5% hemoglobin, with the step of denaturation omitted.

The pH is changed to 5 by addition of a solution of hydrochloric acid.

The hemolysate is then mixed with a mixture of alumina and magnesia (3 parts by weight alumina to 1 part by weight magnesia) and the mixture is agitated for 6 hours.

After centrifuging, a colorless supernatant is obtained.

In the above examples, the soda used to increase the pH is a caustic soda Na(OH).

We claim:

1. A process for decoloring an aqueous solution of substances colored by tetrapyrrole compounds comprising contacting said aqueous solution with at least one adsorbent selected from the group consisting of alumina, magnesia, and magnesium silicate, and then collecting the resulting colorless solution.

2. A process according to claim 1 wherein the solution to be decolored is an aqueous solution of blood derivatives colored by hemoglobin or by other hemen compounds.

3. A process according to claim 2 wherein the solution to be decolored is an aqueous solution of hemolyzed blood.

4. A process according to claim 2 wherein the adsorbent is alumina and/or magnesia.

5. A process according to claim 1 wherein the solution to be decolored is an aqueous solution of a hemolysate of a cellular fraction obtained after separation of plasma from blood.

6. A process according to claim 1 wherein the solution to be decolored is an aqueous solution of a hydrolyzed blood hemolysate.

7. A process according to claim 6 wherein the solution to be decolored is an aqueous solution of a product of enzyme hydrolysis.

8. A process according to claim 7 wherein the solution to be decolored is obtained by hydrolysis using an enzyme selected from the group consisting of pepsin, trypsin, and chymotrypsin.

9. A process according to claim 1 wherein the solution to be decolored is an aqueous solution of an extract of a vegetable substance colored by chlorophyl.

10. A process according to claim 1 wherein the aqueous solution to be decolored has a pH of 2 to 6.

11. A process according to claim 1 wherein the aqueous solution to be decolored is contacted with the adsorbent at a temperature in the range of 0° to 60° C.

* * * * *